B. COHEN.
TIRE PROTECTOR.
APPLICATION FILED SEPT. 23, 1915.

1,174,476.

Patented Mar. 7, 1916.

Witness
C. A. Jarvis

Inventor
Bertram Cohen
by Maurice Blod
attorney

UNITED STATES PATENT OFFICE.

BERTRAM COHEN, OF NEW YORK, N. Y.

TIRE-PROTECTOR.

1,174,476. Specification of Letters Patent. Patented Mar. 7, 1916.

Application filed September 23, 1915. Serial No. 52,151.

*To all whom it may concern:*

Be it known that I, BERTRAM COHEN, a subject of the King of England, residing at New York city, Manhattan borough, county and State of New York, have invented certain new and useful Improvements in Tire-Protectors, of which the following is a full, clear, and exact description.

This invention relates to an improvement in tire-protectors, its object being to provide an attachment for a motor-vehicle, bicycle, etc., having pneumatic tires, arranged to pick or scrape off the tire, while the wheel rotates, any protruding element which might be forced through the shoe or casing and also through the inner tube, when said element touches the ground. In other words, should the casing pick up a tack, nail, screw or other sharp article, which frequently happens, the point of which partly pierces the tire casing, the other end thereof protruding from the surface of the casing, the said article will be picked out or scraped off the casing as soon as the scraper, which forms part of my invention, comes in contact therewith, consequently the picked-up article will not be forced farther into the tire by frequent contact with the ground, during continued revolution of the wheel.

I will now proceed to describe my invention in detail, the essential features of which will be summarized in the appended claims, reference being had to the accompanying drawing, forming part hereof; wherein—

Figure 1:
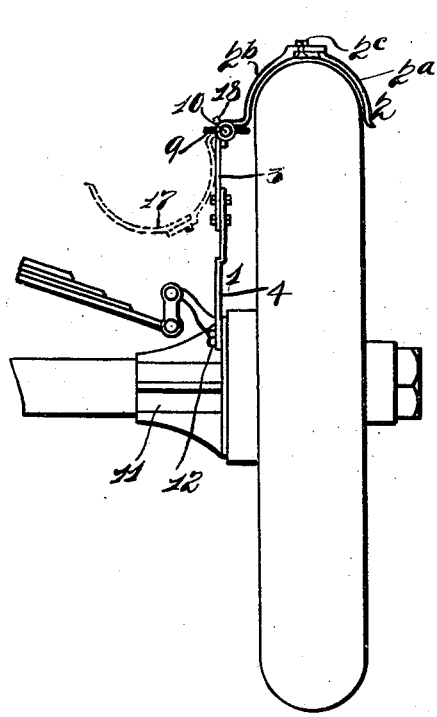
Figure 2:
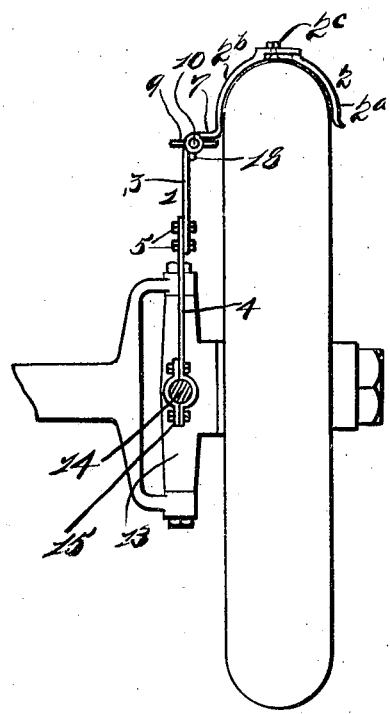
Figure 3:
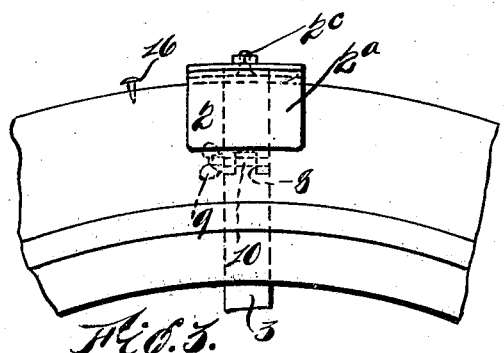
Figure 4:
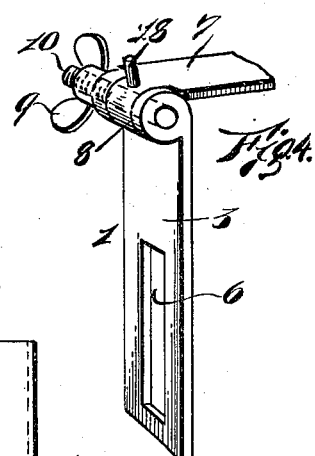
Figure 5:
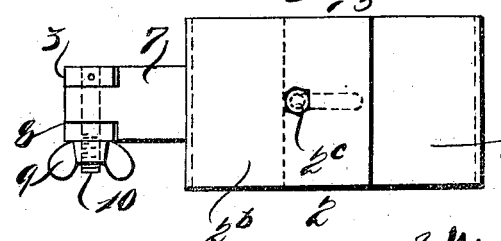

Figure 1 is an end view of one of the rear wheels of a motor-vehicle, a portion of the axle-housing being also shown equipped with my improved protector; Fig. 2 is a similar view of one of the front wheels, illustrating my improved protector secured to the steering-knuckle arm; Fig. 3 is a fragmentary side view of a pneumatic tire illustrating the scraper portion of my protector; Fig. 4 is a fragmentary perspective view illustrating the manner of connecting the scraper and support therefor; and Fig. 5 is an enlarged top plan view of the scraper.

As herein illustrated my improved tire protector consists of a support 1 and scraper 2. For the purpose of adjustment, I preferably form the support 1 out of a plurality of members 3 and 4 adjustably connected by bolts 5 which pass through a slot 6 in the member 3 (Fig. 4) and an alining slot in the member 4. The scraper 2, which is preferably semi-circular to correspond to the contour of the tire casing, as shown, carries an extension 7 which is pivotally secured as at 8 to the support-member 3. To adjustably secure the scraper to the support, I provide a wing-nut 9 which engages the threaded end of a binding-bolt 10. When the wing-nut is screwed up tightly the scraper 2 will be securely held in position upon the support therefor.

The lower member 4 of the support 1, for the rear tires, is secured to any fixed part of the chassis, as for instance to the axle-housing 11, by bolts 12 or otherwise. The lower member 4 of the support for the scraper of the front tires is mounted to move with the steering-knuckle 13, and in this instance I have shown it as secured to the steering-arm 14 by a clamp 15, but of course I do not limit myself to this particular manner of securing the support 1.

When the scraper 2 is properly adjusted relatively to the tires, it will be positioned slightly away therefrom (one-eighth of an inch for instance) in order that it will not contact with the tires, but be sufficiently close thereto in order to pick up or scrape off any protruding article, such as a tack, for instance, illustrated by 16 in Fig. 3.

It will be quite evident that the scraper 2 will pick off any protruding article which may attach itself to the tire, thereby preventing the danger of a puncture from such article by being forced through the tire-elements by frequent contact with the ground as the wheel continues to revolve. It will be also apparent that the scraper 2 will be stationary and any protruding article picked up by the tire will be scraped off the same as soon as it comes in contact with the scraper.

Should it become necessary to apply chains to the rear tires, the scrapers 2, adjacent said tires, will be swung to the dotted position 17, Fig. 1. Should it become necessary to remove the front or rear tires, the scraper 2 therefor can be swung away therefrom.

It will be seen that I can adjust the scrapers relative to the tread portion of the tires by loosening the bolts 5 and sliding the members 3 and 4 inwardly or outwardly as may be required, to shorten or lengthen the supports for the scrapers.

To limit the inward movement of the scraper 2, I provide a stop-pin 18 which, when the scraper is in position adjacent the tire, will contact with the support member 3 and prevent the scraper from coming in contact with the shoe of the tire.

The scrapers 2 are preferably made up of slidably connected members 2$^a$, 2$^b$, held in slidable relationship by a bolt or pin 2$^c$, whereby the scraper may be adjusted for use in connection with tires of varying widths.

Having now described my invention what I claim and desire to secure by Letters Patent is:

1. A tire protector comprising a support consisting of a plurality of slidably connected members arranged for securement to a vehicle having pneumatic tires, a scraper pivotally secured to one of said support members, and arranged to be positioned adjacent a tire but out of contact therewith, and means to lock said scraper in adjusted positions.

2. A tire protector comprising a support, and a scraper movably connected thereto, said scraper comprising a plurality of adjustably connected members.

Signed at New York city, N. Y. this 22 day of September, 1915.

BERTRAM COHEN.

Witnesses:
MAURICE BLOCK,
EDWARD A. JARVIS.